United States Patent Office 3,559,159
Patented Jan. 26, 1971

3,559,159
APPARATUS FOR VARYING THE ANGULAR DIRECTION OF A CONCENTRATED ACOUSTIC BEAM
Hermann Wilhelm August Harms and Reinhard Wilhelm Leisterer, Bremen, Germany, assignors to Fried. Krupp Gesellschaft mit beschränkter Haftung, Essen, Germany
Filed July 10, 1969, Ser. No. 840,683
Claims priority, application Germany, July 11, 1968,
P 17 66 766.2
Int. Cl. G01s 9/66
U.S. Cl. 340—5                                5 Claims

ABSTRACT OF THE DISCLOSURE

A system for controlling the direction of propagation, and for angularly deflecting, a concentrated acoustic beam produced by a linear array of acoustic sine wave transmitters, the system controlling the direction of the concentrated acoustic beam by establishing a constant phase relationship between the sine wave signals applied to every adjacent pair of transmitters and effecting an angular deflection of the concentrated beam by establishing a predetermined frequency difference between the waves applied to every adjacent pair of transmitters.

BACKGROUND OF THE INVENTION

The present invention relates to an acoustic beam transmitter, and particularly to an arrangement for producing a directionally concentrated acoustic beam, or pencil beam, and for angularly deflecting this beam at a predetermined rate so as to cause the beam to traverse a given region in a predetermined period of time.

Various devices for producing such a result are already known in the art. For example, devices of this type are disclosed in German Pat. Nos. 869,164; 855,822; 901,000; and 902,357. These devices generally employ either mechanically adjustable transducer, or transmitter, units or a stationary, linear array of individual transmitters which are uniformly spaced from one another and which are supplied with signal voltages having respectively different frequencies so that, for example, one transducer radiates a signal at a frequency of $f_1$ and each of the remaining transducers radiates a signal at a frequency of $f_i = f_1 \pm (i-1)\Delta f$, where $i$ is an integer having any value between 2 and $n$, $n$ being the total number of transmitters provided.

In these devices, the frequency $\Delta f$ is produced either by means of electromechanical phase shifters, such as variometers or resolvers, or by means of sideband modulation.

The electromechanical phase shift method has the advantage of permitting the resulting beam to be given any desired angular direction $\theta$ with respect to a line perpendicular to the linear array of transmitters or to be deflected continuously over a given angular range. However, this method has certain drawbacks in that the phase shifters have a substantial degree of mechanical inertia so that the beam can only be angularly deflected at a low rate.

The sideband modulation method permits high angular deflection speeds since $\Delta f$ can have any value. However, this method requires complex, and hence expensive, electronic circuitry for angularly deflecting the concentrated beam over the desired angular range.

SUMMARY OF THE INVENTION

It is a primary object of the present invention to overcome these drawbacks and difficulties.

Another object of the invention is to improve the degree of control which can be exerted over such a concentrated acoustic beam.

A further object of the invention is to reduce the complexity, and hence the cost, of the circuitry required for controlling the angular deflection of such a beam.

Still another object of the invention is to provide inexpensive circuitry for controlling the angular direction of such a beam and for angularly deflecting the beam over a given angular range at any desired deflection rate.

These and other objects according to the invention are achieved by the provision of an improved generator with a linear array of $n$ acoustic wave transmitters spaced a uniform distance apart and arranged to radiate a concentrated acoustic beam in a direction $\theta$ relative to a line perpendicular to the array, each transmitter being connected to receive a sine wave signal having a given frequency represented by:

$$f_i = f_1 \pm (i-1)\Delta f$$

where:

$f_1$ is the frequency of the signal to one transmitter,
$i$ designates any arbitrary transmitter and is an integer having a value of between 1 and $n$, and
$\Delta f$ is the difference between the frequencies delivered to every adjacent pair of transmitters.

The signal generator according to the invention includes pulse generator means for producing a train of pulses at a repetition frequency of $0.5f_1$, a plurality of first monostable multivibrators each arranged to produce output pulses having a controllably variable duration, a plurality of second monostable multivibrators each being arranged for producing output pulses having a constant duration, a plurality of sine wave producing devices and control means connected to the first multivibrators for controlling the duration of their output pulses. The first multivibrators are connected in cascade, with each having its output connected to the input of the next succeeding multivibrator and the input of the first multivibrator in cascade being connected to the output of the pulse generaor means. Each first multivibrator is arranged to initiate a pulse at its output in response to the trailing edge of a pulse applied to its input. Each second multivibrator is also arranged to produce an output pulse in response to the trailing edge of each pulse applied to its input and each first multivibrator has its output connected to the input of a respective second multivibrator. Each sine wave producing device is connected to the output of a respective second multivibrator for producing a sine wave signal whose frequency is a function of the pulse repetition frequency at the output of its associated second multivibrator, the signal from each producing device constituting the input signal to a respective acoustic wave transmitter.

DESCRIPTION OF THE PREFERRED EMBODIMENTS

Figure 1:
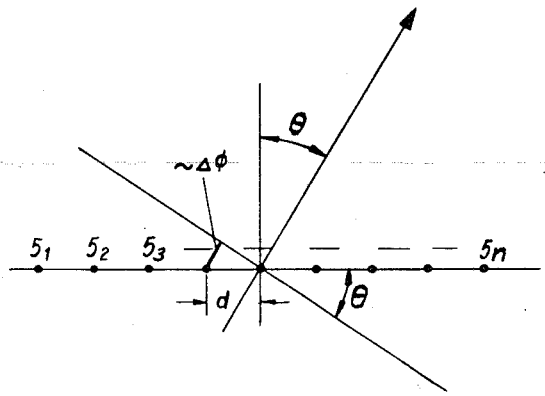
FIG. 1 is a diagram used in explaining the operation of devices of the type with which the invention is concerned.

Referring first to FIG. 1, there is shown a linear array of a plurality of acoustic transducer $5_1, 5_2, 5_3 \ldots 5_n$.

Any arbitrary transducer will be referred to by the reference character $5_i$. This array of acoustic transducer can be caused to emit a concentrated acoustic beam in a direction having an angle of $\theta$ with respect to a line perpendicular to the array. This direction can be represented by the equation:

$$\theta = \arc\sin \frac{\Delta\phi}{2\pi d/\lambda}$$

where $\Delta\phi$ is the electrical angle between the vectors representing the voltages applied to two adjacent transducers $5_i$ and $5_{i+1}$, $d$ is the distance between adjacent transducers and $\lambda$ is the wavelength, in space, of the acoustic signal.

If $\Delta\phi$ is constant, the concentrated acoustic beam will continue to extend in a corresponding direction $\theta$. If, on the other hand, $\Delta\phi$ is made to vary with respect to time, the direction in which the concentrated beam is emitted will correspondingly vary according to the above arc sin function so that the concentrated beam will be angularly deflected through a given angle at a rate proportional to the rate at which $\Delta\phi$ is varied, the angle through which the beam is deflected being determined by the range over which $\Delta\phi$ is varied.

The time rate of change of the angle between the voltage vectors of two adjacent transducers, $d\Delta\phi(t)/dt$, is known to correspond to a frequency difference $\Delta f$ between the two signal voltages in question. This frequency difference can be represented as:

$$\Delta f = \frac{1}{2\pi} \cdot \frac{d\Delta\phi(t)}{dt}$$

To satisfy this relationship in practice, it is only necessary to cause the first sound transmitter, or transducer, $5_1$ to transmit a sound wave having a frequency of $f_1$ and to cause each of the remaining transmitters $5_2$–$5_n$ to transmit a sound wave having a frequency of $f_i = f_1 \pm (i-1)\Delta f$, where $i$ corresponds to the designation of the transmitter in question and will have any integral value between 2 and $n$. The rate of the resulting angular deflection of the concentrated acoustic beam is $$\frac{d\theta}{dt} = \frac{v}{d} \cdot \frac{\Delta f}{f_1}$$

where $v$ is the speed of propagation of the sound in the medium in which the transducers are to operate.

Figure 2:
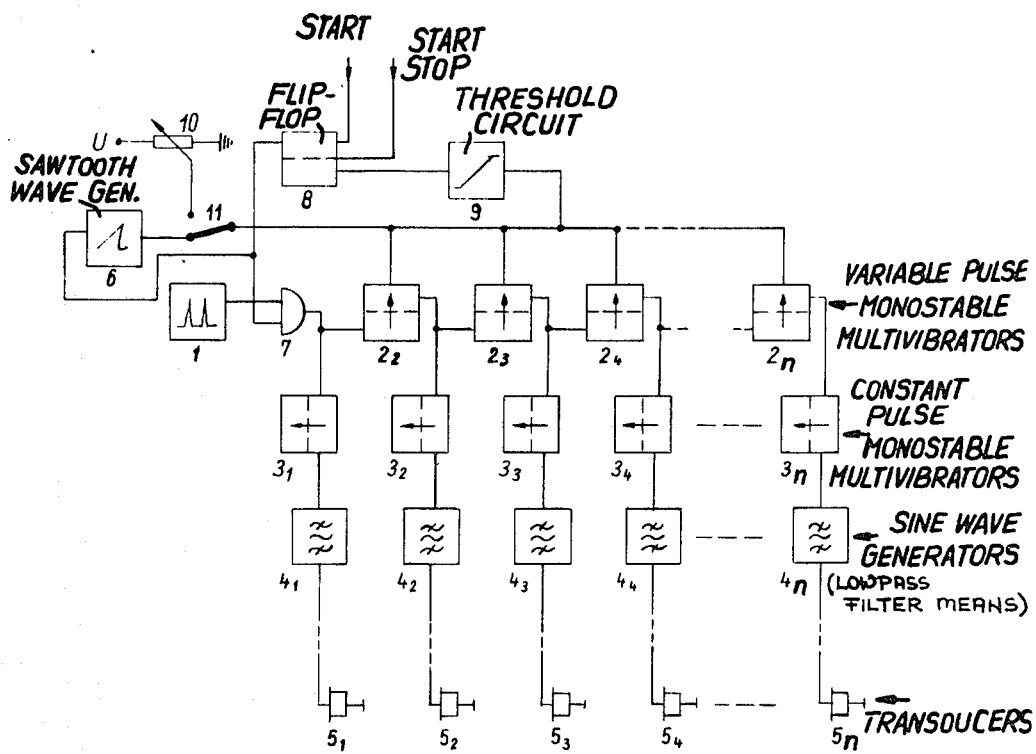
FIG. 2 is a block diagram of a preferred embodiment of the angular beam deflection circuit according to the invention.

FIG. 2 is a block diagram of one form of transmitter apparatus according to the invention. This circuit will be described with reference to the waveform diagrams of FIG. 3. The subscripts appearing in these figures correspond to the subscripts of the associated sound transmitters 5. The circuit of FIG. 2 includes a plurality of monostable multivibrators $2_2$, $2_3$, $2_4$ . . . $2_i$. Each of these multivibrators is of the type whose output pulse duration can be electrically varied. References to variable pulse duration multivibrators are to be found in various of the well known circuit design handbooks, especially when dealing with the object of digital and pulse circuits. One early reference, still dealing with vacuum tubes, is "Electronic Measurement" by Terman and Petit, second edition 1952, McGraw-Hill, chapter 13-3.

The output of each multivibrator $2_i$ is connected to the input of the next succeeding multivibrator $2_{i+1}$. The input of the first multivibrator $2_2$ is connected to the output of an AND gate 7 whose ouput also controls the operation of transducer $5_1$ in a manner analoguous to the control effectuated by the multivibrators 2 on their associated transducers $5_2$–$5_n$. The multivibrators 2 are connected together in such a manner that the output pulses of each multivibrator are triggered by the trailing edge of the input pulses applied thereto.

Figure 3:
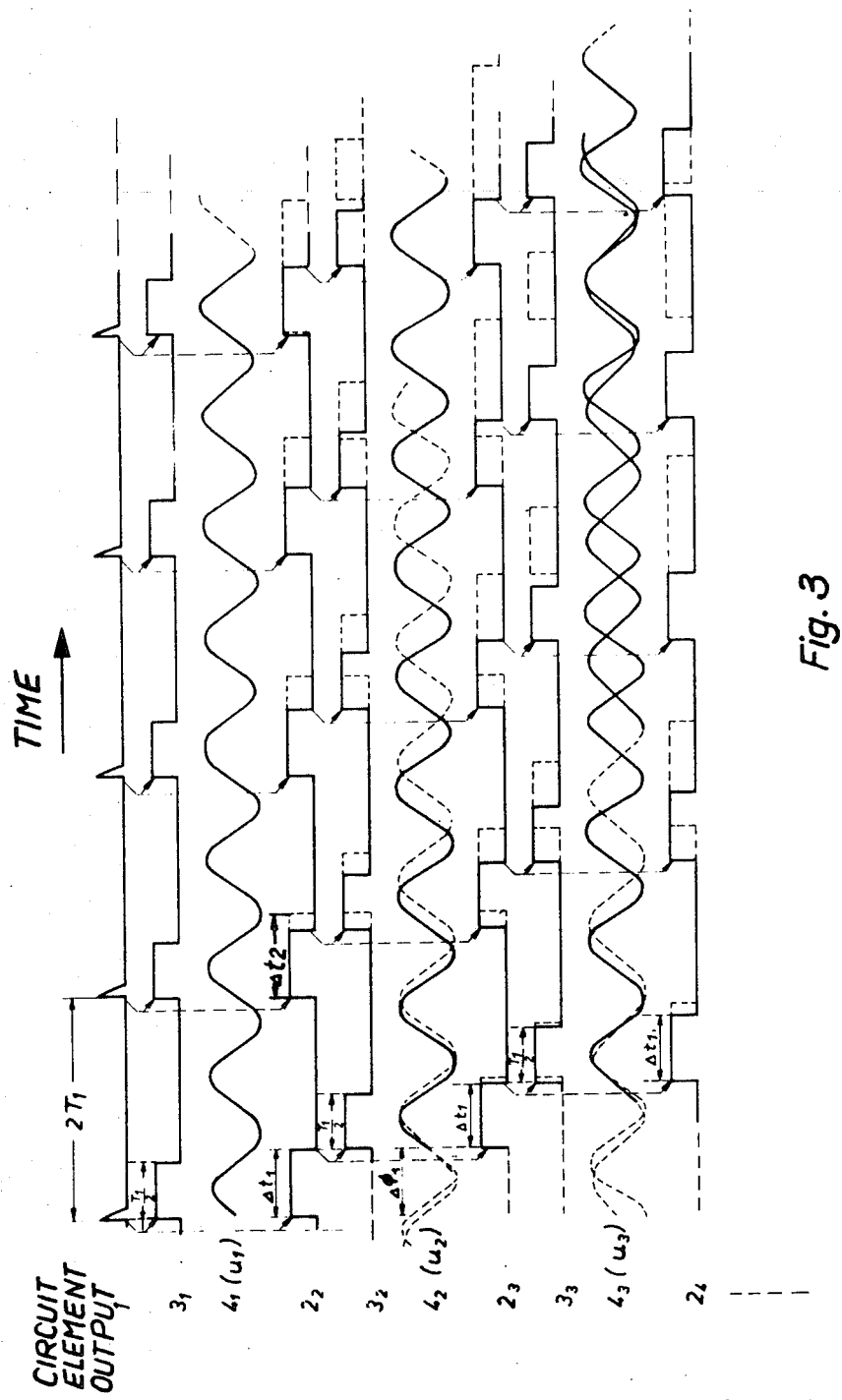
FIG. 3 is a series of waveform diagrams used in explaining the operation of the circiut of FIG. 2.

The circuit further includes $n$ monostable multivibrators $3_1$, $3_2$, $3_3$, $3_4$ . . . $3_n$ each connected to the output of its associated multivibrator 2. The multivibrators 3 are of the type producing output pulses having a constant duration. Multivibrator $3_1$ is connected to the output of gate 7, while each of the remaining multivibrators $3_2$–$3_n$ is connected to the output of a respective one of the multivibrators $2_2$–$2_n$. The multivibrators 3 are arranged so that their output pulses are initiated by the trailing edges of the pulses applied to their inputs. For example, as shown in FIG. 3, each output pulse from multivibrator $2_3$ and multivibrator $3_2$ is initiated by the trailing edge of an output pulse from multivibrator $2_2$. AND gate 7 has one input connected to a pulse generator 1 arranged to produce a train of pulses, with each pulse having a short duration and the period between the successive pulses being equal to $2T_1$, where $T_1 = 1/f_1$ and is constant. Each of the multivibrators 2 is arranged so that its maximum pulse duration is less than $2T_1$. In the preferred embodiment illustrated in FIG. 2 each pulse produced by the multivibrators 3 has a constant duration equal to $T_1/2$.

Connected to the output of each multivibrator is a respective one of a plurality of sine wave generators $4_1$, $4_2$, $4_3$, $4_4$ . . . $4_n$. Each of these generators is of the type which produces an output sine wave whose frequency is a function of the output pulse repetition frequency of its associated multivibrator 3. According to a specific embodiment of the invention, and as illustrated in FIG. 3, the frequency of the sine wave produced by each generator 4 is equal to twice the output pulse repetition frequency of its associated multivibrator 3. This generator 4 may just consist of a low-pass filter means, well known in the art, as to filter out the fundamental wave or a wanted multiple of this fundamental wave, as can be calculated applying the Fourier analysis to the rectangular pulses at the output of the multivibrators $3_i$.

The output sine wave from each generator 4 is delivered to its associated transducer 5 to cause the transducer to produce an acoustic wave having a corresponding waveform.

If the pulse durations of all of the multivibrators 2 are being controlled in unison, i.e. so that at any given instant all of the multivibrators would produce a pulse having the same duration, the phase angle between the vectors representing the sine wave voltages $u_i$ and $u_{i+1}$ from any pair of immediately adjacent generators will have the same value $\Delta t$ for every adjacent pair of generators and will have a value of:

$$\Delta\phi = \left(1 \pm \frac{\Delta t}{T_1}\right) 2\pi$$

A linear array of transducers 5 provided with such voltages will emit a concentrated acoustic beam in a direction determined by the value of $\Delta t$ because $\theta$ is a function of $\Delta\phi$ and $\Delta\phi$ is proportional to $\Delta t$. For example, as is shown by the solid line waveforms of FIG. 3, when the pulse duration of each multivibrator 2 is equal to $\Delta t_1$, the angular phase difference between the signals emitted by adjacent transducers will equal $\Delta\phi_1$.

The circuit of FIG. 2 further includes a flip-flop 8 connected to receive Start and Stop pulses and having its output connected to the other input of gate 7 to deliver an enabling signal to that gate. Upon the delivery of a Start signal, the gate 7 is opened so as to cause pulses to be delivered from generator 1 to the inputs of multivibrators $2_2$ and $3_1$, thus initiating the operation of the circuit. The circuit operation is terminated when a Stop pulse is delivered to flip-flop 8 so as to close gate 7.

The duration of the pulses produced by multivibrators 2 is controlled by a voltage applied to these elements via a switch 11. The switch is movable between two contact positions in one of which it connects the pulse duration control terminals of the multivibrators 2 to a voltage divider 10 connected across a voltage source U and in the other of which it connects those multivibrator terminals to the output of a sawtooth wave generator 6. The generator 6 is of the type producing sawtooth waves having a sloping leading edge and, preferably, a relatively steep trailing edge. Generator 6 has a control input connected to the output of flip-flop 8 to cause the generation of sawtooth waves to be initiated by the enabling signal produced by the flip-flop.

The duration of the pulses produced by multivibrators 2 is determined by the instantaneous value of the voltage applied to their pulse duration control terminals. If it is desired to radiate a concentrated acoustic beam in a fixed direction, or to manually vary the beam direction, the switch 11 is moved into a position in which the voltage produced by divider 10 is applied to the multivibrators 2. Then, since the duration of the pulses produced by multivibrators 2 determines the phase angle between the sine waves produced by each adjacent pair of transducers 5, and this in turn determines the angular direction $\theta$ of the resulting concentrated beam, the beam is given the desired direction by adjusting divider 10 to apply the necessary voltage to the multivibrators 2. A manual variation of the setting of divider 10 will produce a corresponding variation in the angular direction $\theta$ of the acoustic beam.

When it is desired to angularly deflect the acoustic beam, i.e. to alter the angle $\theta$, automatically, the switch 11 is moved into the position illustrated so that the output of sawtooth wave generator 6 is connected to the multivibrators 2. Generator 6 begins producing a sawtooth wave upon receipt of a Start signal by flip-flop 8. The resulting sawtooth wave then causes the pulse duration of the output pulses produced by multivibrators 2 to progressively increase at a rate determined by the slope of the leading edge of the sawtooth wave. The progressive increase in the duration of the pulses produced by multivibrators 2 causes the frequency of the sine wave applied to each succeeding transducer 5 to be decreased by an amount equal to $\Delta f$ with respect to the frequency of the wave applied to the immediately preceding transducer and this results in a progressive increase in the phase angle between each adjacent pair of output voltages $u_i$ and $u_{i+1}$. The rate at which the duration of the output pulses from multivibrators 2 is varied determines the magnitude of $\Delta f$ and hence the rate at which $\theta$ varies. The range over which the duration of the multivibrator output pulses varies determines the range over which the angle $\theta$ is correspondingly varied during each angular deflection cycle. The duration of the multivibrator output pulses is varied between a value of $\Delta t_1$ and $\Delta t_n$ at a constant rate by the sawtooth wave from generator 6. The operation of the circuit when the multivibrators 2 are being controlled by generator 6 is illustrated by the broken line waveforms in FIG. 3, wherein it may be seen that the trailing edges of the output pulses from each multivibrator $2_i$ advance progressively with respect to the pulses from generator 1, it being these trailing edges which trigger the production of the pulses by multivibrators $3_i$ and $2_{i+1}$.

The generators 4 could be constituted by bandpass filters of the type which filter out a sinusoidal wave whose period is equal to one-half the repetition period of the square wave pulses applied thereto by the associated multivibrators 3.

The frequencies of the voltages applied to the transducers 5 differ from one transducer to the next by an amount $$\Delta f = \frac{1}{T_1} \cdot \frac{d\Delta t(t)}{dt}$$

$$\Delta f = \frac{1}{T_1} \cdot \frac{1}{T_s} (\Delta t_2 - \Delta t_1)$$

where $T_S$ is the period during which the acoustic beam is to undergo one complete angular deflection. Thus, the frequency of the signal to each transducer $5_i$ will have the value:

$$f_i = f_1 \pm (i-1) \Delta f$$

The beginning and end of the angular deflection period are determined by the control of gate 7 by the output state of flip-flop 8. Upon the appearance of a Start pulse at the input of flip-flop 8, gate 7 is opened, the pulses produced by generator 1 are permitted to pass to multivibrators $2_1$ and $3_1$ and the sawtooth wave generator 6 is turned on, thus initiating both the production of a concentrated acoustic beam and the angular deflection of its propagation direction at a predetermined rate. If the output voltage from generator 6 reaches a value corresponding to the maximum desired pulse duration $\Delta t_n$, corresponding to the first pulse produced by the last multivibrator $2_n$, the threshold value of a threshold circuit 9 will be attained so as to apply a Stop signal to flip-flop 8 which terminates the output signal from the flip-flop, thus closing gate 7 and turning off generator 6. This terminates the beam deflection operation and resets the apparatus to a state in which it is ready to repeat the process.

Figure 4:
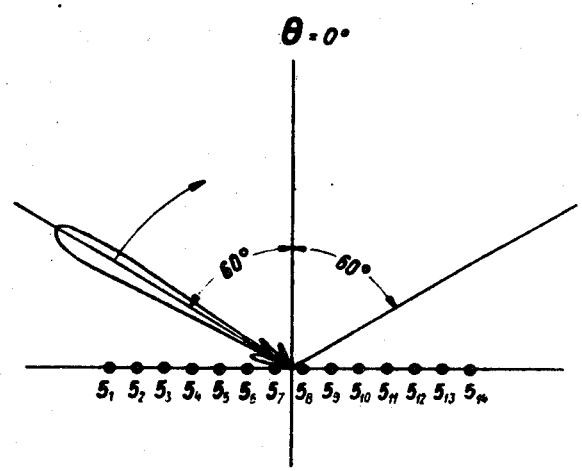
FIG. 4 is a simplified pictorial view of a plurality of sound transducers employed in embodiments according to the invention.

One specific embodiment of the invention is illustrated in FIG. 4 to include fourteen transducers which are to produce a concentrated acoustic beam and to deflect this beam through an angle $\theta$ varying between $+60°$ and $-60°$. The acoustic radiation pattern produced by this array is illustrated in FIG. 4. The deflection of the beam is to occur during a period $T_s$ of 500 ms. The transducers are spaced from one another by an amount such that $d/\lambda = 0.453$. The frequency of the acoustic signal for an angle $\theta = 0°$ is to be 10 kHz.

It can be determined from the equation previously presented that for a deflection range of $+60°$ to $-60°$, which deflection is to be in the clockwise direction illustrated in FIG. 4, $\Delta\phi$ must vary between $141°$ and $-141°$. In other words, $\Delta\phi_n - \Delta\phi_1$ must equal $-282°$. In order for the beam to traverse the selected angular range in the specified time period, $\Delta f$ must equal $-1.57$ Hz. The negative value for $\Delta f$ indicates that the frequency of the signals applied to the transducers decreases from one transducer to the next succeeding transducer. In order for the center transducer to operate at the required frequency of 10 kHz., the repetition rate of the pulses produced by generator 1 must be selected so that $f_1 = f_7 + (7-1) \Delta f$, assuming that transducer $5_7$ is the center transducer of the array. In this case, $f_1$ should equal approximately 10.01 kHz. Under these conditions, the duration $\Delta t$ of the pulses produced by multivibrators 2 varies between 60.8 ms. and 139.2 ms.

Figure 5:
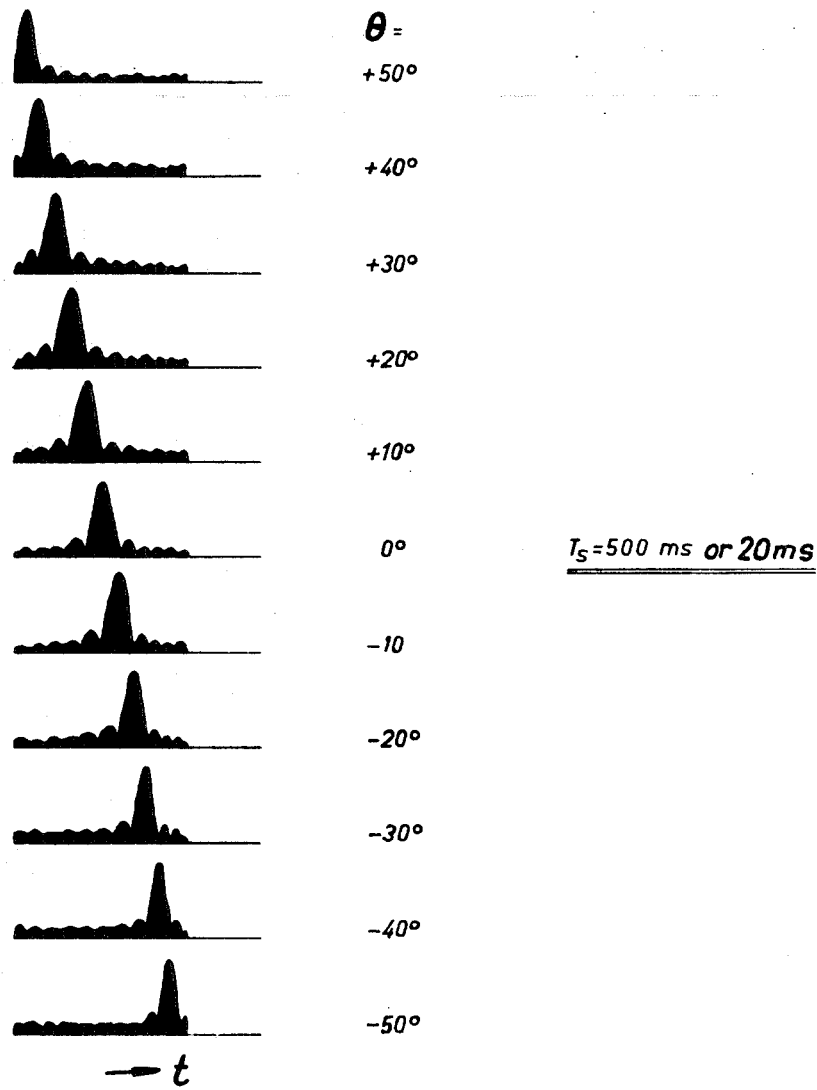
FIG. 5 is a series of waveforms illustrating the acoustic beam deflection produced by apparatus according to the invention.

FIG. 5 illustrates the resulting deflection of the acoustic beam. The series of waveforms shown in this figure represent the signals received by a plurality of transducers disposed at spaced angular positions in the region traversed by the acoustic beam, the angular position of each transducer being indicated to the right of each waveform. All of the waveforms of FIG. 5 are taken with respect to the selected angular deflection traverse time which could be, for example, 500 ms. or 20 ms. The waveforms of FIG. 5 clearly illustrate the highly concentrated nature of the beam produced by the system according to the invention and the precision with which it is angularly deflected.

It will be understood that the above description of the present invention is susceptible to various modifications, changes and adaptations.

What is claimed is:

1. A signal generator for use with a linear array of $n$ acoustic wave transmitters spaced a uniform distance apart and arranged to radiate a concentrated acoustic beam in a direction $\theta$ relative to a line perpendicular to the array, each transmitter being connected to receive a sine wave signal having a given frequency represented by:

$$f_i = f_1 \pm (i-1) \Delta f$$

where:
$f_1$ is the frequency of the signal to one transmitter, $i$ designates any arbitrary transmitter and is an integer having a value of between 1 and $n$, and
$\Delta f$ is the difference between the frequencies delivered to every adjacent pair of transmitters, said generator comprising:

(a) Pulse generator means for producing a train of pulses at a repetition frequency of $0.5 f_1$;
(b) A plurality of first monostable multivibrators connected in cascade with each having its output connected to the input of the next succeeding multivibrator and the input of the first multivibrator in cascade being connected to the output of said pulse generator means, each said multivibrator being arranged to initiate a pulse at its output in response to the trailing edge of a pulse applied to its input and to produce output pulses having a controllably variable duration;
(c) A plurality of second monostable multivibrators each for producing an output pulse having a constant duration in response to the trailing edge of each pulse applied to its input, each said first multivibrator having its output connected to the input of a respective second multivibrator;
(d) A plurality of sine wave producing devices each connected to the output of a respective second multivibrator for producing a sine wave signal whose frequency is a function of the pulse repetition frequency at the output of its associated second multivibrator, the signal from each said producing device constituting the input signal to a respective acoustic wave transmitter; and
(e) Control means connected to said first multivibrators for controlling the duration of their output pulses.

2. An arrangement as defined in claim 1 wherein the duration of each output pulse produced by each said second multivibrator is equal to $0.5 T_1$, where $T_1$ is the period of a signal having a frequency of $f_1$.

3. An arrangement as defined in claim 2 wherein the number of first multivibrators is one less than the number of second multivibrators and the input of that second multivibrator not associated with a first multivibrator is connected directly to the output of said pulse generator means.

4. An arrangement as defined in claim 2 wherein the duration of the output pulses produced by said first multivibrators is determined by a control voltage applied to said first multivibrators and said control means are arranged for applying a selectable control voltage to said first multivibrators.

5. An arrangement as defined in claim 4 wherein said control means are arranged for applying to said first multivibrators a control voltage whose amplitude varies in time so as to produce a predetermined difference in the frequency of the outputs of every adjacent pair of sine wave producing devices.

References Cited

UNITED STATES PATENTS 3,419,845  12/1968  Thiede et al. _____ 340—3

RICHARD A. FARLEY, Primary Examiner

U.S. Cl. X.R.

340—3; 343—100